United States Patent [19]

Higaki et al.

[11] Patent Number: 4,724,565
[45] Date of Patent: Feb. 16, 1988

[54] ROTARY WASHING APPARATUS FOR AIRCRAFT

[75] Inventors: Takahiro Higaki, Yokohama; Katsumi Kawase, Yokosuka, both of Japan

[73] Assignee: Sumitomo Heavy Industries, Ltd., Tokyo, Japan

[21] Appl. No.: 932,242

[22] Filed: Nov. 19, 1986

[30] Foreign Application Priority Data

Nov. 21, 1985 [JP] Japan ................... 60-261976

[51] Int. Cl.⁴ .............................................. B60S 3/06
[52] U.S. Cl. ................... 15/53 A; 15/DIG. 2
[58] Field of Search ............ 15/DIG. 2, 53 R, 53 A, 15/53 AB, 97 B, 21 R, 21 E

[56] References Cited

U.S. PATENT DOCUMENTS

| 3,196,472 | 7/1965 | Ventrella | 15/53 R |
| 3,662,418 | 5/1972 | Kamiya | 15/53 A |
| 3,819,991 | 6/1974 | Weigele | 15/53 A |
| 4,285,736 | 8/1981 | Arato | 15/53 A |

FOREIGN PATENT DOCUMENTS

| 0021936 | 2/1981 | Japan | 15/53 AB |
| 58-111029 | 7/1983 | Japan . | |
| 58-126295 | 7/1983 | Japan . | |
| 58-126294 | 7/1983 | Japan . | |
| 0106350 | 6/1984 | Japan | 15/53 A |

Primary Examiner—Edward L. Roberts
Attorney, Agent, or Firm—Armstrong, Nikaido, Marmelstein & Kubovcik

[57] ABSTRACT

A rotary washing apparatus for aircraft includes a rotary scrubber pivotally supported by a main body of washing machine through arms, and a torque motor for imparting a predetermined rotary torque to the arms so as to force the rotary scrubber against an external skin surface of the aircraft for washing the same by scrubbing. The rotary washing apparatus further includes a control device for preventing the rotary scrubber from being forced against a surface portion being washed of the aircraft with an excessively high pressing force. The control device is operative to sense the number of revolutions of the rotary scrubber and controls the operation of the torque motor in accordance with the number of revolutions of the rotary scrubber.

5 Claims, 9 Drawing Figures

ROTARY WASHING APPARATUS FOR AIRCRAFT

BACKGROUND OF THE INVENTION

This invention relates to a rotary washing apparatus for aircrafts, and more particularly it is concerned with a rotary washing apparatus which is equipped with a control device for preventing the scrubber from being pressed against a surface portion to be washed of the airframe of an aircraft with an excessively great force.

Heretofore, it has been usual practice to rely on manual operations performed by operators to wash by scrubbing the external skin surface of an aircraft. Proposals have, however, been made to mechanically perform this washing operation as disclosed, for example, in co-pending applications U.S. Ser. No. 722,972 filed on Apr. 12, 1985 and U.S. Ser. No. 770,922 filed on Aug. 30, 1985, of which some of the applicants are the same as those among the applicants of the present application. In the systems described in these copending applications, an aircraft is placed on a turntable installed on the ground level, and a plurality of washing machines each having a rotary washing apparatus are moved to positions close to an aircraft to perform washing operations.

An aircraft is complex in construction and shape and different types of aircraft have different sizes. An aircraft is usually of monocoque construction which has a thin outer shell or skin and a framework for supporting the skin. The external surface of the skin is low in contact surface pressure strength, and this strength is, for example, about 0.35 kgf/cm$^2$ at a single skin portion formed of aluminum alloy and about 0.1 kgf/cm$^2$ at a honeycomb structure portion. For this reason, rotary scrubbers, such as rotary brushes, have been widely in use for washing an aircraft. In the aircraft washing apparatus designed to perform washing operations mechanically, it is necessary to control the force with which the rotary scrubbers are pressed against the external skin surface of an aircraft both for achieving excellent washing results and for avoiding damage to the skin.

Control devices suitable for use with an aircraft washing apparatus may include a device of the direct contact type using limit switches or other known means and a device of the distance measuring system which utilizes magnetism, ultrasonic waves or light rays. The control device of the former type would, however, experience difficulty in effecting adjustments of proper contact and abnormal contact in amount owing to the construction of switches and other parts. In the device of the latter type, magnetism does not act on nonmetallic skin portion formed as of fiber reinforced plastic material, and the condition of reflection of ultrasonic waves and light rays may vary depending on the curvature of the external skin surface of the aircraft. This would make it difficult to make correct measurements and make the control device complex in construction.

Japanese Patent Unexamined Publication Nos. 126294/1983 and 126295/1983 propose to use a washing apparatus equipped with pressing means for rendering uniform the pressure at which a rotary scrubber or brush presses against the external skin surface of an aircraft to wash the same by scrubbing. In this washing apparatus, the rotary brush is supported by arms pivotally mounted on a movable part of a main body of the washing apparatus. The brush pressing means imparts a rotary torque to the arms so as to force the brush against a surface portion to be washed of the air-craft, and at the same time monitors the angle of elevation of the arms. When the angle of elevation of the arms deviates from a predetermined range of angles for such a reason as a change in the contour of the surface portion to be washed, the movable part of the main body of the apparatus is moved vertically to adjust the distance between the external skin surface that is being washed and the brush so as to render uniform the pressure at which the brush rubs against the external skin surface. Like the direct contact system referred to hereinabove, this control system would suffer the disadvantage that difficulty is experienced in adjusting the range of pivotal movements of the brush supporting arms in such a manner that the pivotal movement of the arms matches the adequate amount of contact of the rotary brush with the outer skin surface. Moreover, since adjustments of the pressure at which the rotary brush presses against the external skin surface are effected by moving the movable part of the main body of the washing apparatus, the control device would become complex in construction and yet it might be impossible to promptly cope with a abrupt change in the pressure at which the brush presses against the external skin surface to be washed. In other words, the apparatus disclosed in Japanese Unexamined Patent Publication Nos. 126294/83 and 126295/83 would be able to achieve satisfactory washing results when the surface to be washed is planar. In the case of aircraft, however, the external skin surfaces are curved and include surface portions which cannot be secured in place. Aircraft wings have surface portions that cannot be secured in place, for example. Owing to their structures of cantilever, the wings have a characteristic such that a wind tends to cause them to move upwardly and downwardly when the aircraft is stationary on the ground. In the case of aircraft B-747 (trade name) generally referred to as a jumbo jetliner, its wings have been ascertained to move vertically ±20 cm when exposed to the wind of a velocity of 12 m/sec. No consideration is given to this specific characteristic of the aircraft structure in the prior art documents referred to hereinabove. Thus the problem with regard to the safety of aircraft would be encountered in the rotary washing apparatus of the prior art.

SUMMARY OF THE INVENTION

This invention has as its object the provision of a rotary washing apparatus which, simple in construction and reliable in performance, is capable to achieving an excellent result in washing the external skin surface of an aircraft while avoiding damage which might otherwise be caused when the rotary scrubber is forced thereagainst too strongly.

For the above end, the rotary washing apparatus according to the invention has a construction wherein rotary washing means is supported by arm means which in turn is supported for pivotal movement by a washing machine, and wherein the arm means is moved by biasing means for pivotal movement so as to force the rotary washing means against a surface portion to be washed of the external skin surface of an aircraft. The rotary washing apparatus is provided with control means which monitors the number of revolutions of the rotary washing means and controls the operation of the biasing means in accordance with the number of revolutions of the rotary washing means, thereby preventing the latter from being forced against the surface portion to be washed of the external surface of the aircraft with an excessively high pressure.

The control means may preferably effect control such that it de-actuates the biasing means when the number of revolutions has fallen below a predetermined value. When the biasing means is deactivated, the arm means is moved, by the reaction of rotation of the rotary washing means in a direction in which it moves away from the external skin surface being washed. As a result, the rotary washing means is positively separated from the external skin surface, and damage which might otherwise be caused by the rotary washing means located inordinately close to the aircraft can be avoided.

The above and other objects, features and advantages of the invention will become apparent from the description of the embodiment of the invention set forth hereinafter when considered in conjunction with the accompanying drawings.

DESCRIPTION OF THE PREFERRED EMBODIMENT

A preferred embodiment of the rotary washing apparatus in conformity with the invention will now be described by referring to the accompanying drawings.

Figure 1:
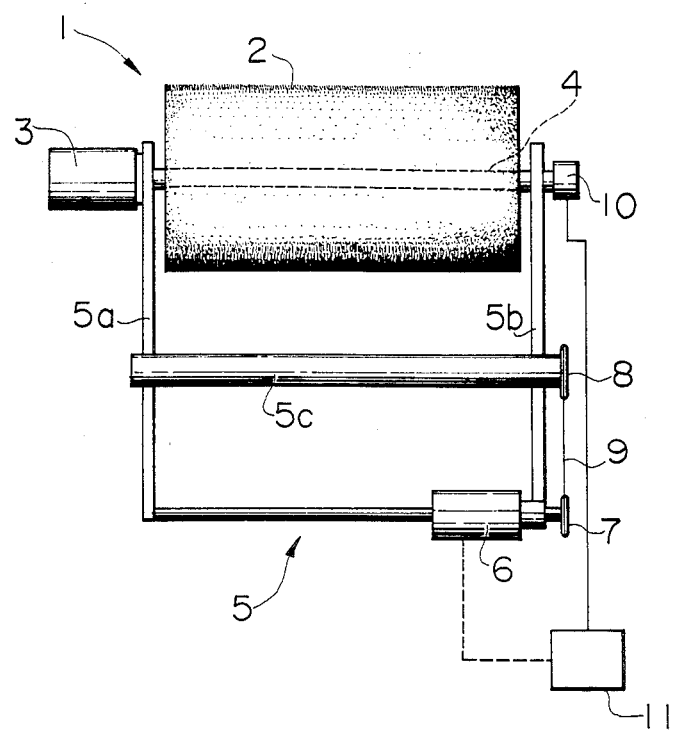
FIG. 1 is a front view of the rotary washing apparatus comprising an embodiment of the invention.

Referring to FIG. 1, the rotary washing apparatus generally designated by reference numeral 1 comprises a washing brush 2 of substantially cylindrical configuration. The brush 2 is supported for rotation by a pair of parallel brush arms 5a and 5b of a brush frame 5 through a rotary shaft 4 to which the rotary brush 2 is secured. The brush frame 5 has secured substantially to its central portion a rotary shaft 5c which is supported for rotation by a main body of a washing machine. A torque motor 6 is supported by the brush frame 5 at one end portion thereof opposite the washing brush 2 with respect to the rotary shaft 5c.

The torque motor 6 supports on a drive shaft thereof a sprocket wheel 7 which is connected through an endless chain 9 to a sprocket wheel 8 supported at a forward end of the rotary shaft 5c. An electric motor 3 for driving the brush 2 is supported on one arm 5a of the brush frame 5 and drivingly connected to the rotary shaft 4 for the brush 2.

Figure 2:
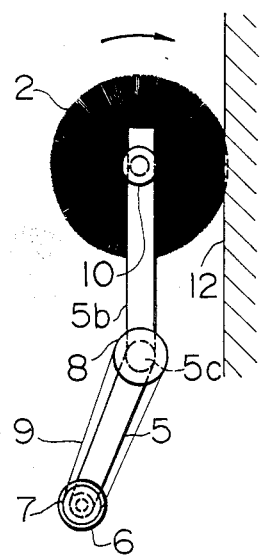
FIG. 2 is a side view of the apparatus shown in FIG. 1.

The rotary washing apparatus 1 is equipped with a control device for controlling the pressure at which the washing brush 2 presses against the external skin surface of an aircraft. The control device comprises a rotation sensor 10 supported on the other arm 5b of the brush frame 5 for monitoring the number of revolutions of the rotary shaft 4, and a control unit 11 for controlling the torque motor 6 based on a signal representing the number of revolutions of the rotary shaft 4 out-put by the sensor 10. The rotary sensor 10 may be a pulse generator. During a washing operation, a rotational torque oriented in the direction of an arrow shown in FIG. 2 is imparted to the brush frame 5 by the torque motor 6, so that the washing brush 2 is forced against a portion of the external skin surface of an aircraft to be washed with a predetermined pressure. The control device, whose operation is subsequently to be described in detail, operate such that, as the number of revolutions of the washing brush 2 falls below a predetermined value, it regulates the operation of the torque motor 6 so as to move the washing brush 2 away from a surface portion 12 being cleaned of the aircraft.

Figure 3:
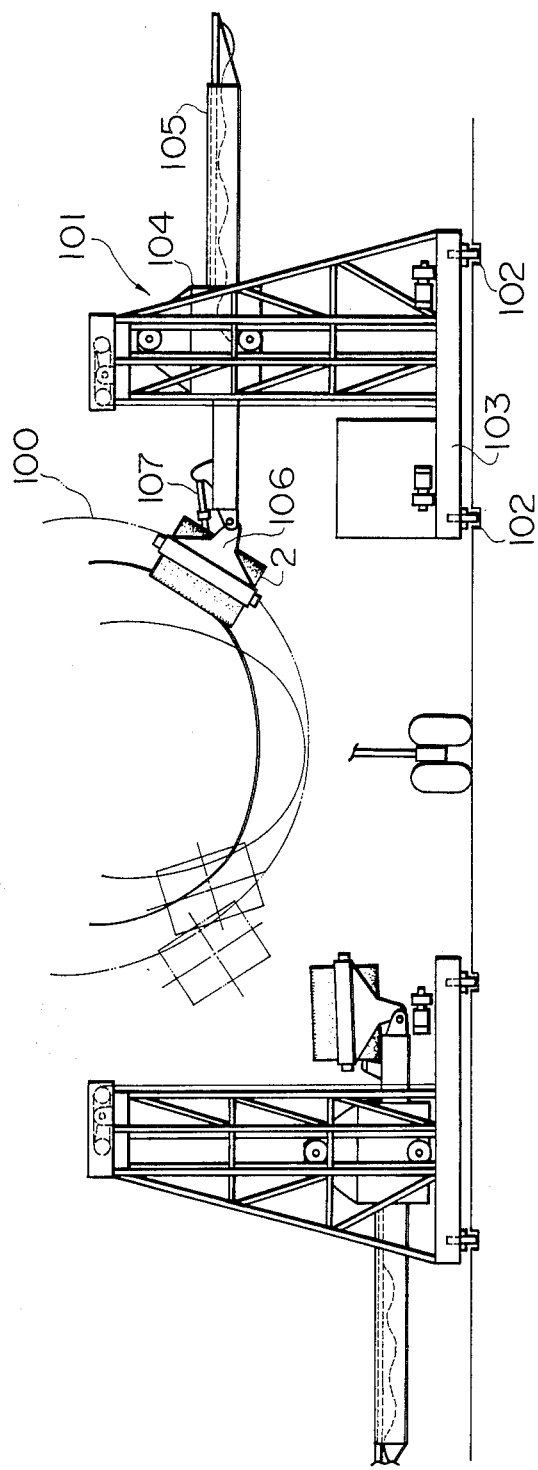
FIG. 3 is a schematic view of one example of the washing machines in which the washing apparatus shown in FIG. 1 is incorporated.
Figure 4:
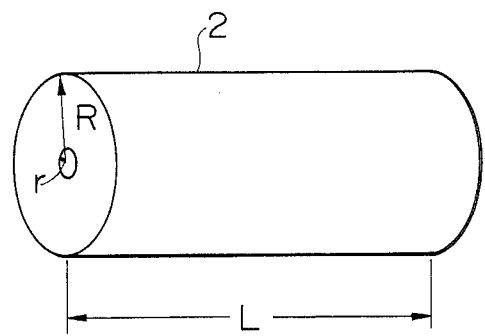
FIG. 4 and 5 are views in explanation of the relation between the size of a rotary brush and its contact pressure.
Figure 5:
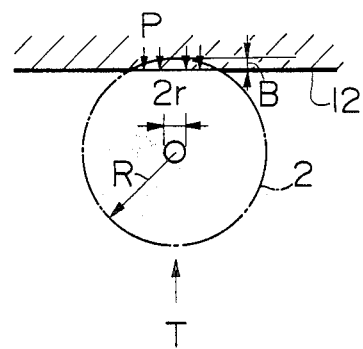

FIG. 3 shows a washing machine for washing the fuselage of an aircraft in which the rotary washing apparatus according to the invention is incorporated. For clear representation, some portion of the brush frame 5 of the rotary washing apparatus is omitted in FIG. 3. In the figure, reference numeral 100 designates the fuselage of an aircraft in contour. There are plural contours indicated in FIG. 3, which mean that the different types of aircrafts differ from each other in the size of fuselage. A washing machine 101 for the fuselage is arranged at a predetermined location in an airport, such as an apron, and is movable by means of rails 102 on the ground and a truck 103 of the machine travelling along rails 102 for movement longitudinally along the fuselage 100 of the aircraft. The truck 103 supports thereon an upwardly extending tower-like structure 104 which in turn supports a boom 105 extending substantially parallel to the ground surface for elevatory movement and movement toward and away from the fuselage 100. The boom 105 supports at its forward end a support arm 106 for pivotal movement, and the support arm 106 supports the rotary shaft 5c of the brush frame 5 of the rotary washing apparatus 1. A telescopic actuator 107 is connected at one end thereof to the support arm 106 and at an opposite end thereof to the boom 105 to adjust the tilting of the washing brush 2 so as to match the curvature of the external skin surface of the fuselage 100 of the aircraft. The operation of the washing machine 101 is as follows. The boom 105 is moved vertically and horizontally in accordance with a portion of the external skin surface to be washed of the aircraft positioned at a predetermined location, and then the tilting angle of the washing brush 2 is adjusted. Thereafter, the washing brush 2 is brought into pressing contact with the fuselage 100 and moved longitudinally of the fuselage 100 to wash same by scrubbing. The washing machine in which the rotary washing apparatus according to the invention can be incorporated is not limited to the aforesaid type of washing machine, and the rotary washing apparatus can have application in many other types of washing machine. The washing machines may be of known construction and form no part of the present invention, so that further detailed description of their construction shall be omitted.

During washing operations, balance is maintained between the reaction to the revolution of the brush 2 and the biasing force exerted by the torque motor 6 when the washing brush 2 is kept in pressing contact with the surface portion 12 being washed with a certain amount of contact. Let the amount of contact of the brush 2, the radius of the brush 2, the radius of the rotary shaft 4, the length of the brush 2, the pressing force exerted on the brush 2 and the surface pressure applied to the surface portion 12 to be washed be denoted by B, R, r, L, T and P respectively. Then, the condition of balance referred to hereinabove can be expressed by the following equation.

$$T = P \times L \times 2\sqrt{R^2 - (R - B)^2}$$

Thus the surface pressure P can be expressed as follows.

$$P = \frac{T}{L \times 2\sqrt{R^2 - (R - B)^2}}$$

In the above equation, it will be understood that a predetermined biasing force exerted by the torque motor 6 is distributed in the area of contact of the washing brush 2 with the surface portion 12, and the mean surface pressure is reduced. However, if the biasing force exerted on the brush 2 becomes higher than is necessary, bristles of the brush 2 would succumb to the pressure and be bent, with a result that the rotary shaft 4 supporting the brush 2 would be brought into direct contact with the surface portion 12 to be washed. When this condition occurs, the rotary shaft 4 and the surface portion 12 would be almost in line-to-line contact with each other, and the area of contact would be substantially zero. The result of this would be that, as can be seen in the above equation, the surface pressure P would become very high. The reason why the pressing force exerted by the brush rises more than is necessary would be, because the rotary torque produced by the torque motor 6 is constant at all times, a change in the relative position between the surface portion being washed and the brush 2 owing to, for instance, variations of the contour of the surface to be washed or advance of the rotary brush with an improper speed.

Figure 6:
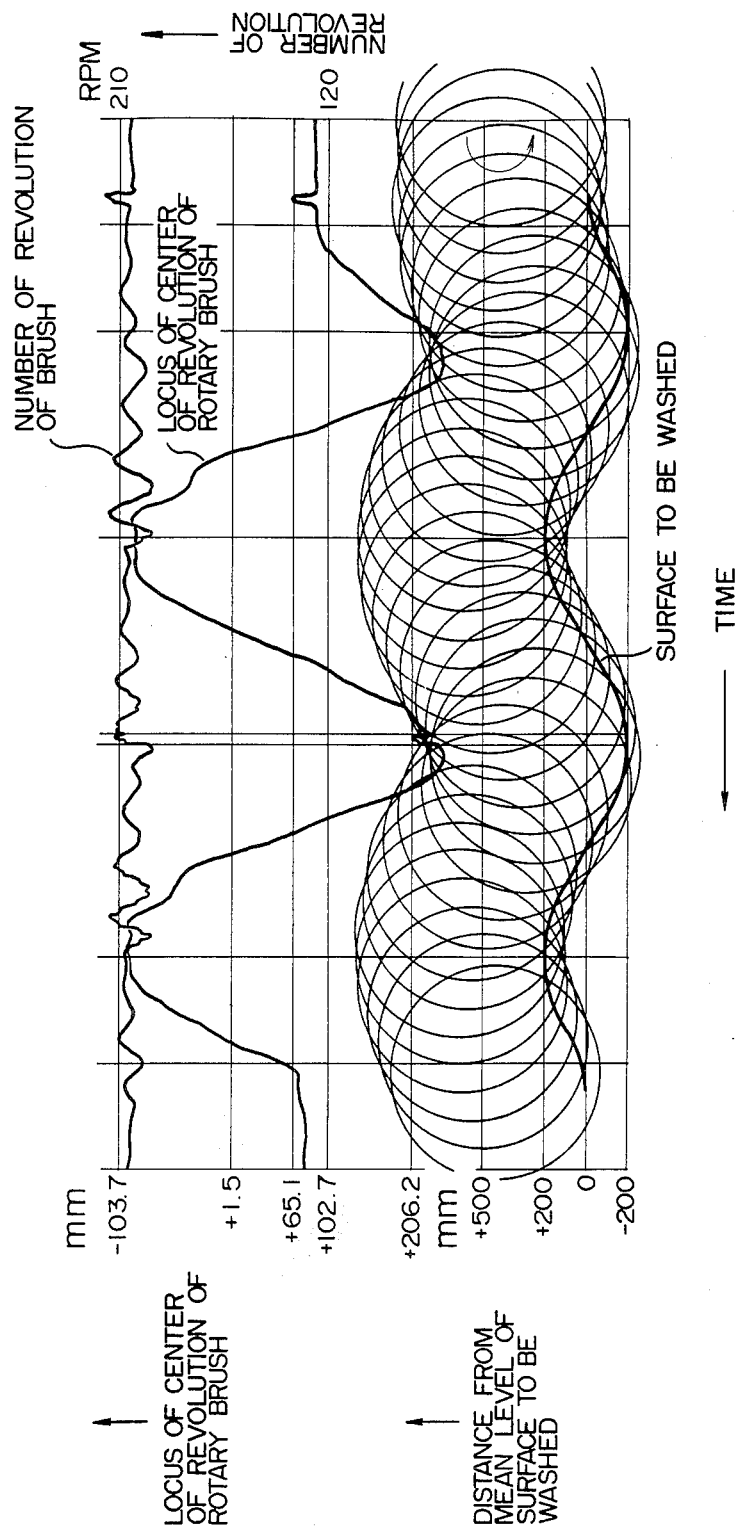
FIGS. 6 and 7 are diagrams showing the relation between the amount of contact of a rotary brush and the number of revolutions of the rotary brush.
Figure 7:
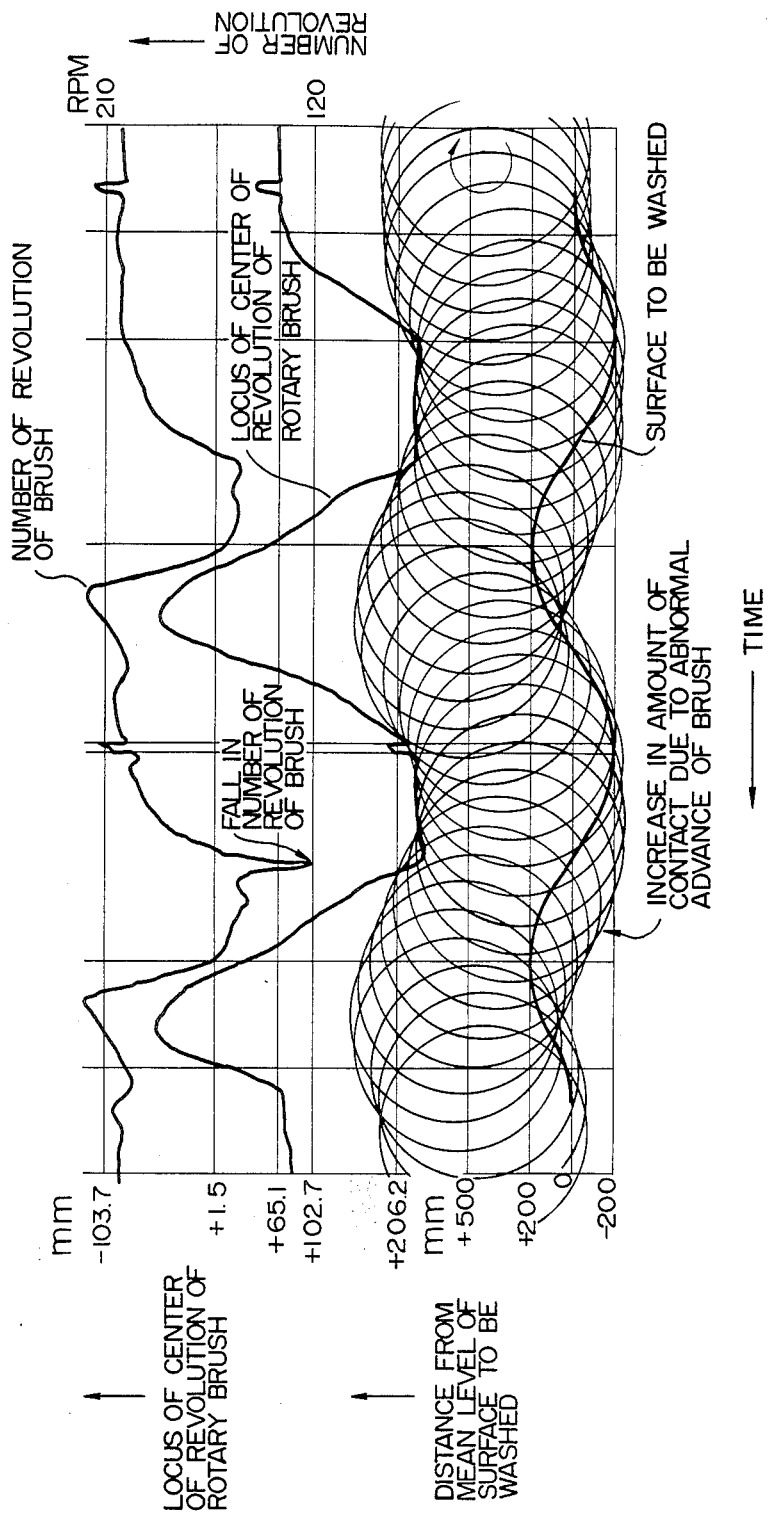

We have conducted tests on the pressing of a rotary washing brush against a surface portion to be washed, to establish the relation between the number of revolutions of the washing brush and the amount of contact thereof with the surface portion being washed. FIGS. 6 and 7 show the results of the tests. The tests were conducted by simulating a condition in which the surface portion to be washed of the external skin surface of an aircraft moves upwardly and downwardly due to some cause during a washing operation, more specifically, by simulating a condition in which wings are moved upwardly and downwardly by 20 cm due to a prevailing wind. FIGS. 6 and 7 show two washing conditions, wherein the washing is performed in a normal manner and the washing brush is brought to a location at which it is inordinately close to the surface portion to be washed, respectively.

In the tests, the surface portion to be washed was given with a sine curve cross-sectional shape having an amplitude of ±20 cm, in place of actually moving the surface portion to be washed in a vertical direction. The washing brush, to which a constant biasing force was applied by a torque motor, was moved along the curved surface portion being washed while being rotated. Graphs in FIGS. 6 and 7 were drawn by a pen recorder and show the number of revolutions of the washing brush, the locus of the center of revolution of the washing brush, the locus of the washing brush and the shape of the surface portion being washed. The locus of the center of revolution of the washing brush is represented by a distance from a reference level, which is set 500 mm above the level of the surface portion being washed in a stationary condition (the stationary level designated by 0 in a lower portion of the ordinate of each graph at the left side of the figure), to the center of revolution of the rotary washing brush. This distance, which represents a change in the amount of contact of the washing brush with the surface portion to be washed, is indicated by minus (−) when it is above the reference surface and by plus (+) when it is below the reference surface. It has been ascertained that the washing brush moves inordinately close to the surface portion being washed due to the inability of the biasing of the torque motor to cope with a sudden change in the contour of the surface portion being washed or a variation in the velocity of movement of the washing brush. In the test shown in FIG. 7, the washing brush was rotated in a direction opposite to the direction in which it was rotated in the test shown in FIG. 6, thereby inducing the washing brush to move inordinately close to the surface portion being washed.

As can be seen in FIGS. 6 and 7, an increase in the amount of contact of the washing brush with the surface portion being washed uniquely corresponds to a decrease in the number of revolutions of the washing brush. In other words, when a washing operation is performed in a normal fashion, the amount of contact of the washing brush with the surface portion being washed is substantially constant during the entire operation. However, when the washing brush moves to a location at which the brush is inordinately close to the surface portion being washed, the amount of contact of the washing brush with the surface portion being washed increases, with a result that the frictional force produced between the washing brush and the surface portion being washed acts as a load which reduces the number of revolutions of the washing brush.

Figure 8:
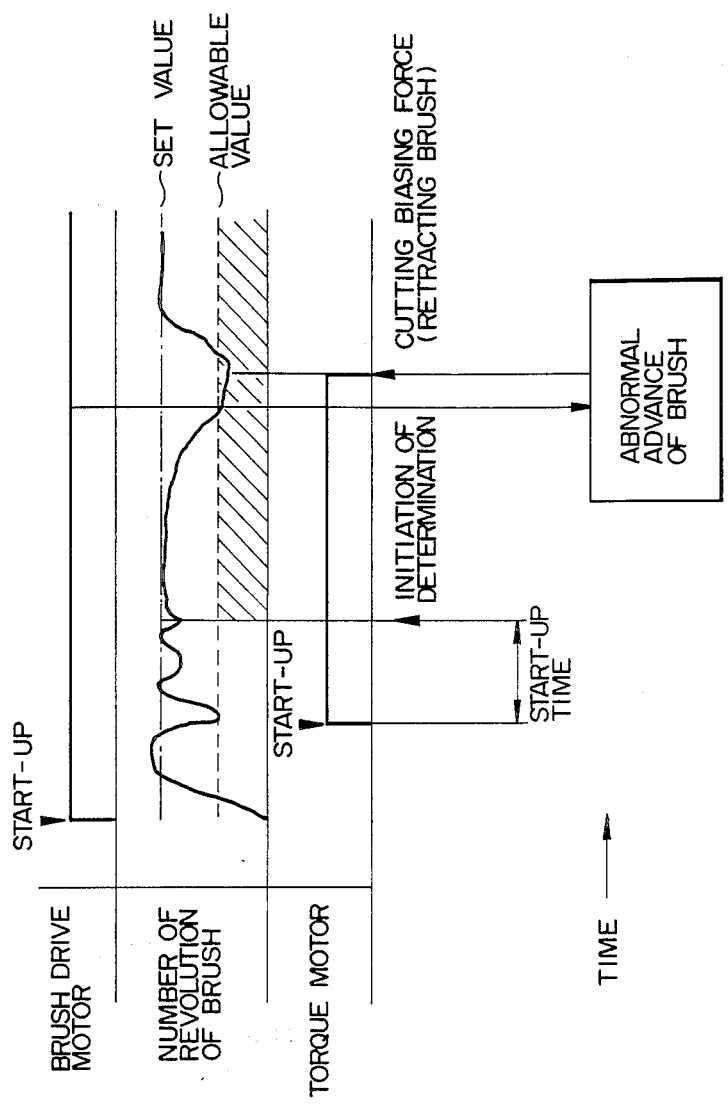
FIG. 8 is a time chart showing the manner of operation of a torque motor to cope with a change in the number of revolutions of the rotary brush.
Figure 9:
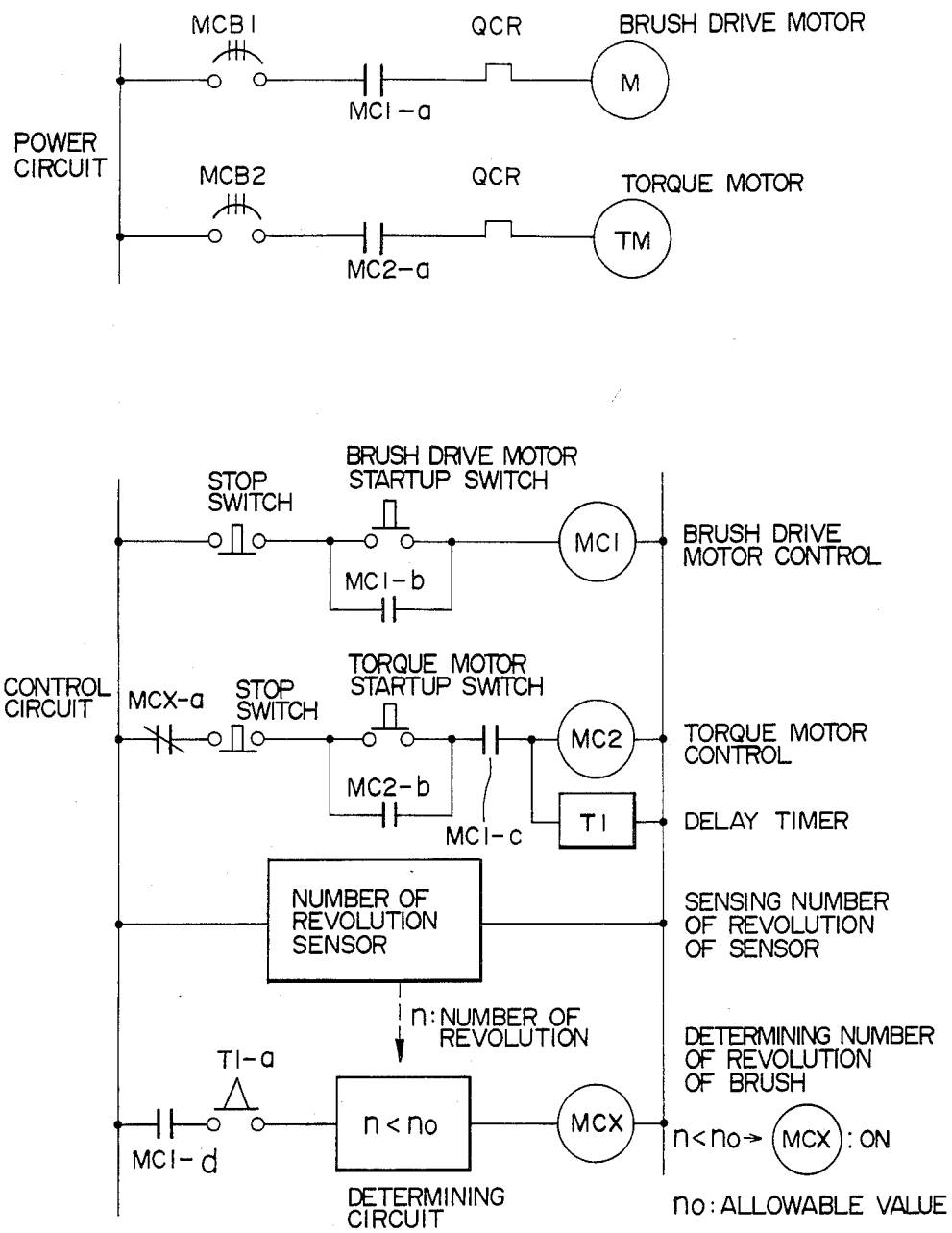
FIG. 9 is a diagram showing the sequence control circuit of the control device of the washing apparatus shown in FIG. 1.

FIG. 8 is a time chart showing the condition of operation of the torque motor 6 relative to the number of revolutions of the washing brush 2 in the embodiment described hereinabove. FIG. 9 shows the power circuit for the brush drive motor 3 and torque motor 6, and the control circuit of the control device.

In the power circuit shown in FIG. 9, the brush drive motor 3 and torque motor 6 are connected to a power source circuit via circuit breakers MCB1 and MCB2 and relay contacts MC1-a and MC2-a respectively. Meanwhile the control circuit includes a brush drive motor control circuit, a torque motor control circuit, a brush number-of-revolutions sensing circuit and a brush number-of-revolutions determining circuit. The brush drive motor control circuit is constituted to supply power to a relay MC1 via a stop switch and a motor startup switch, and the motor startup switch has a relay contact MC1-b connected in parallel therewith. The torque motor control circuit has a stop switch, a motor startup switch, relay contacts MCX-a and MC1-c and a relay MC2 which are connected in series with the power source circuit. A relay contact MC2-b and a delay timer T1 are connected in parallel with the torque motor startup switch and relay MC2 respectively. The contact MCX-a is normally closed. The brush number-of-revolutions sensing circuit is constituted to supply power to the rotation sensor 10. The brush number-of-revolutions determining circuit has a relay contact MC1-d, a timer relay contact T1-a, a determining circuit and a relay MCX which are connected in series with the power source circuit. The determining circuit, which receives a number-of-revolutions signal n inputted thereto from the rotation sensor 10, compares the input signal with an allowable value signal $n_0$ which has been set beforehand and passes an electric current to the relay MCX when $n < n_0$.

Operation of the control circuit of the aforesaid construction is as follows.

(1) When it is desired to start a washing operation, the startup switch for the brush drive motor 3 is depressed to form the control circuit for the brush drive motor. This passes an electric current to the relay MC1 which is energized to turn on the relay contacts MC1-a to MC1-d. As a result, the power circuit for the brush drive motor 3 is completed, so that the motor 3 is actuated and drives the brush 2 for rotation at a predetermined number of revolutions as shown in FIG. 8. Even if the brush drive motor startup switch is turned off, the power supply to the relay MC1 is carried out via the relay contact MC1-b.

(2) Then, depression of the startup switch for the torque motor 6 completes the control circuit for the torque motor 6 to supply power to the relay MC2. Energization of the relay MC2 turns on the relay contacts MC2-a and MC2-b, to form the power circuit for the torque motor 6, so that the torque motor is actuated to exert a biasing force on the washing brush 2 which presses against the surface portion 12 to be washed.

(3) Simultaneously as the relay MC2 is energized, the delay timer T1 is actuated to count time that elapses following the torque motor startup. The biasing force exerted by the torque motor 6 causes the washing brush to press against the surface portion 12 to be washed and the number of revolutions of the brush 2 temporarily falls due to contact with the surface portion 12 as shown in FIG. 8.

This fall in the number of revolutions of the brush 2 is sensed by the rotation sensor 10, but, since the contact T1-a of the delay timer T1 is not turned on yet, no power is supplied to the determining circuit and control of the torque motor 6 is not effected. As is the case with the brush drive motor control circuit, the torque motor control circuit is continuously formed via the relay contact MC2-b, even if the startup switch for the torque motor 6 is turned off.

(4) After lapse of a predetermined period of time following the startup of the torque motor 6, the contact T1-a is turned on under the control effected by the delay timer T1, thereby rendering the determining circuit operative as shown in FIG. 8. In the event that the number-of-revolutions signal n becomes smaller than the allowable value $n_0$ due to an abnormal advance of the washing brush 2 toward the surface portion 12 being washed which might be caused by an abrupt change in the configuration of the surface portion 12 or some other factor, the determining circuit supplies power to the relay MCX to energize the same. As a result, the relay contact MCX-a of the torque motor control circuit is turned off and power supply to the relay MC2 is blocked, thereby rendering the torque motor 6 inoperative.

(5) Upon the torque motor 6 being rendered inoperative, the washing brush 2 is released from contact with the surface portion 12 to be washed by the reaction to the revolution of the brush 2, thereby removing from the surface portion 12 the abnormally high pressing force that might otherwise be exerted thereon by the brush 2. Thus, as shown in FIG. 8, the number of revolutions of the washing brush 2 increases. When it is desired to continuously perform the washing operation, the torque motor startup switch is depressed again. This renders operative the torque motor 6 and the control device in the same sequence as described hereinabove.

(6) When it is desired to interrupt the washing operation, the operator may depress the stop switches for the brush drive motor 3 and torque motor 6 to break the respective control circuits. This renders the brush drive motor 3 and torque motor 6 inoperative.

From the foregoing description, it will be appreciated that, in the invention, control of the pressing force exerted by the brush on the external skin surface of aircraft is effected by monitoring the number of revolutions of the washing brush. This feature offers the advantage that damage to the external skin surface of an aircraft, which might otherwise be caused to occur by the washing brush becoming excessively close to the aircraft external skin surface, can be positively avoided without reducing the efficiency with which washing operations are performed. Further, the washing apparatus according to the invention is simple in construction and easy to operate and can be produced at low costs.

While the invention has been described by referring to the preferred embodiment thereof, it is to be understood that the invention is not limited to the specific form of the embodiment shown and described herein, and that many changes and modifications may be made thereto within the scope of the appended claims by one of ordinary skill in the art.

What is claimed is:

1. A rotary washing apparatus for aircraft comprising:
   rotary washing means for scrubbing a surface portion to be washed of the aircraft;
   arm means pivotally supported by a main body of a washing machine for supporting said rotary washing means for rotation, said arm means being operative to position said rotary washing means on the surface portion to be washed of the aircraft;
   drive means for driving said rotary washing means for rotation;
   biasing means for urging said rotary washing means to press against the surface portion to be washed of the aircraft by imparting a constant rotary torque to the arm means; and
   control means for preventing said rotary washing means from exerting an excessively high pressing force on the surface portion to be washed of the aircraft, said control means being operative to sense number of revolutions of said rotary washing means to control operation of said biasing means in accordance with the number of revolutions of said rotary washing means.

2. A rotary washing apparatus as claimed in claim 1, wherein said control means comprises a sensor for sensing the number of revolutions of said rotary washing means, and a control unit operative to render said biasing means inoperative when a number-of-revolutions signal generated by said sensor falls below a predetermined value, and wherein said biasing means comprises a torque motor directly connected to said arm means.

3. A rotary washing apparatus as claimed in claim 2, wherein said control means further comprises a timer device operative to actuate said control unit with a predetermined time lag behind startup of said torque motor, so as to avoid inadvertent actuation of said washing means which might otherwise be caused by a temporary fall in the number of revolutions of said rotary washing means taking place when said washing means is initially brought into contact with the surface portion to be washed of the aircraft.

4. A rotary washing apparatus as claimed in claim 2, wherein said rotary washing means comprises a rotary brush of substantially cylindrical configuration, said rotary brush being supported at opposite ends thereof by one end of said arm means, said one end of said arm means supporting said sensor and said drive means, said arm means supporting said torque motor at the other end thereof and being supported at a substantially intermediate portion thereof as viewed longitudinally by said main body of the washing machine.

5. A rotary washing apparatus for aircraft comprising:
  rotary washing means including a rotary brush of substantially cylindrical configuration for scrubbing a surface portion to be washed of the aircraft;
  arm means for supporting said rotary washing means, said arm means supporting at one end thereof said rotary brush for rotation and being pivotally supported at a substantially intermediate portion thereof as viewed longitudinally by a main body of a washing machine so as to position said rotary brush on the surface portion to be washed of the aircraft;
  drive means supported at one end of said arm means to drive said rotary brush for rotation;
  torque motor means for imparting a predetermined rotary torque to said arm means to force said rotary brush against the surface portion to be washed of the aircraft, said torque motor means being supported at the other end of said arm means and drivingly connected to said substantially intermediate portion of said arm means at which said arm means is supported by the main body of the washing machine; and
  control means for preventing said rotary washing means from exerting an excessively high pressing force on the surface portion to be washed of the aircraft, said control means comprising a sensor mounted at the one end of said arm means for sensing the number of revolutions of said rotary brush, a control unit for comparing a number-of-revolutions signal supplied from said sensor with an allowable value of the number of revolutions of said rotary brush set beforehand and rendering said torque motor means inoperative when the number-of-revolutions signal falls below said allowable value of the number of revolutions, and a timer device operative to actuate said control unit with a predetermined time lag behind startup of said torque motor means, so as to avoid an inadvertent actuation of said rotary brush which might otherwise be caused by a temporary fall in the number of revolutions of said rotary brush taking place when said rotary brush is initially brought into contact with the surface portion to be washed of the aircraft.

* * * * *